Nov. 20, 1934.   F. FRELIN   1,981,500
LOCKING DEVICE
Filed Aug. 17, 1933
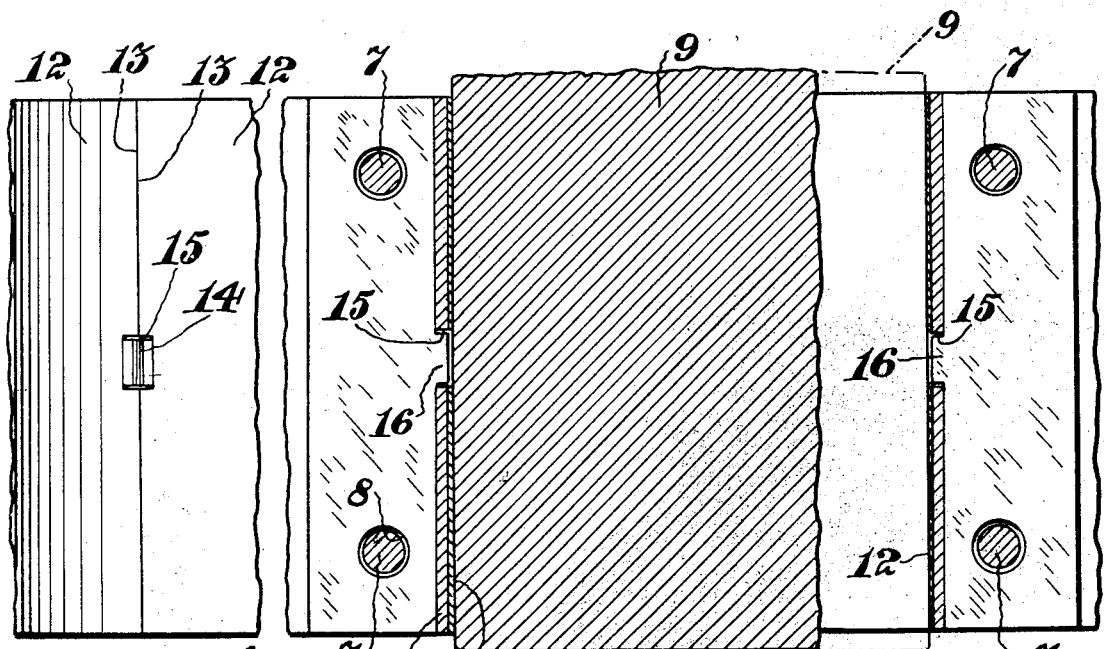
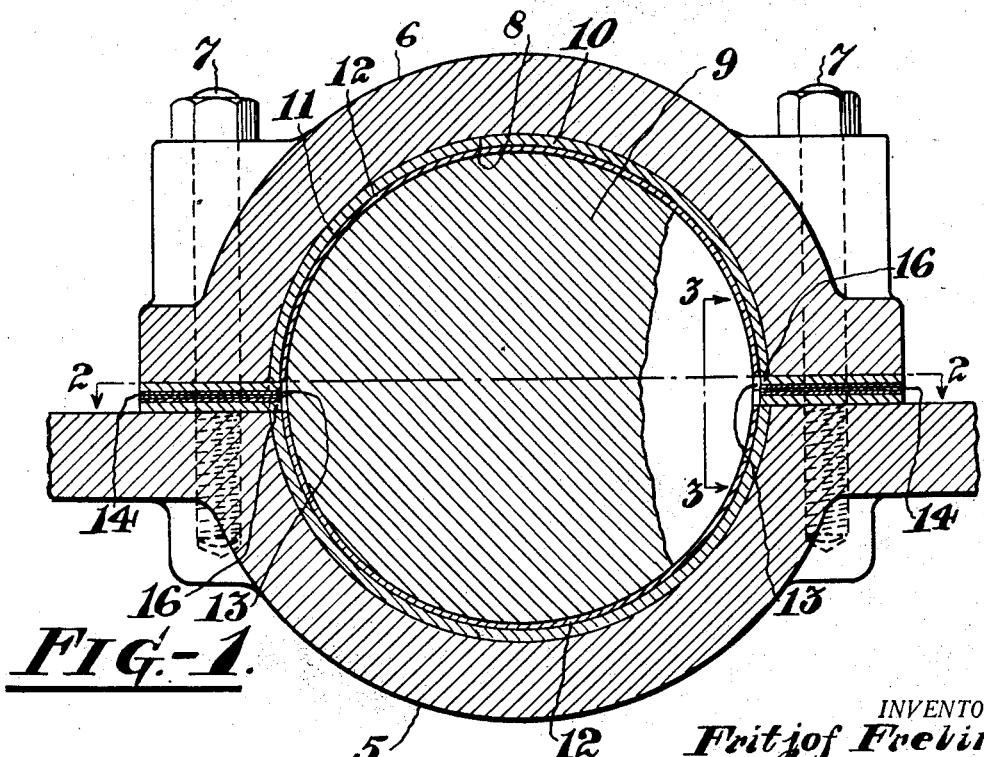
INVENTOR.
Fritjof Frelin
BY
HIS ATTORNEY.

Patented Nov. 20, 1934

1,981,500

UNITED STATES PATENT OFFICE 1,981,500

LOCKING DEVICE

Fritjof Frelin, Phillipsburg, N. J., assignor to Ingersoll-Rand Company, Jersey City, N. J., a corporation of New Jersey Application August 17, 1933, Serial No. 685,539

1 Claim. (Cl. 308—237)

This invention relates to locking devices, and more particularly to a locking device for bearing liners.

The invention is particularly adapted for use in connection with thin bearing liners of the type which are seated loosely in the bearing and clamped therein by the bolts whereby the several sections of the bearing, proper, are clamped together.

Bearing liners of this character are generally of uniform diameter throughout their lengths, as distinguished from liners having projecting portions with end flanges adapted to seat against the ends of the bearing sections. In practice the half-sections of the liner are originally of slightly larger diameter than the bore within the bearing and the adjacent surfaces of the liner sections are placed in face-to-face contact. Thus, when the bolts are tightened for clamping the bearing sections together the liner sections are forced together and are pressed tightly against the surfaces of the bearing sections. This arrangement assures a true cylindrical bearing surface for the shaft operating therein. Unless disturbed by dis-assembling the bearing, the liners will remain as originally placed and their frictional engagement with the bearing sections will remain unimpaired.

In many cases, however, it becomes necessary to remove the bearing cap for purposes of inspection or repairs. Obviously, the repeated dis-assembling and re-assembling of the parts tend to diminish the binding effect between the liner and bearing sections and it is, therefore, desirable that the liner be suitably locked within the bearing, otherwise the liner may shift its position relatively to the bearing and cause injury to the machine of which it forms a part.

It is accordingly an object of the invention to assure the retention of the liner in a correct position within the bearing.

Another object is to assure the correct relative positions of the several sections of the liner.

Other objects will be in part obvious and in part pointed out hereinafter.

In the accompanying drawing in which similar reference numerals refer to similar parts, Figure 1 is a sectional elevation of a bearing and its liner equipped with a locking device constructed in accordance with the practice of the invention, Figure 2 is a plan view, partly in section, taken through Figure 1, on the line 2—2, looking in the direction indicated by the arrows, and Figure 3 is an end view of the locking device, taken on the line 3—3 in Figure 1, looking in the direction indicated by the arrows.

Referring more particularly to the drawing, 5 designates a bearing and 6 a cap secured to the bearing 5 as by bolts 7. The bearing 5 and the cap 6 have a smooth, unbroken bore 8 of somewhat larger diameter than that of the shaft 9 which the bearing supports and slightly smaller than the external diameter of a bearing liner 10 seated in the bore 8 to provide a bearing surface for the shaft.

The bearing liner 10 which consists of a pair of semi-cylindrical members comprises a thin outer shell 11 adapted to seat against the bore 8 and may, as is customary, have bonded to its inner surface, suitable anti-friction material 12 upon which the shaft 9 bears. The liner sections are preferably the same length as the bearing and the cap and are seated in contacting relationship with each other at their longitudinal edges 13.

In order to enable the bearing 5 and the cap 6 to be suitably adjusted with respect to each other spacing members or shims 14 are interposed between the adjacent surfaces of these elements and are held in position by the bolts 7 which extend through apertures 8 in the shims.

In accordance with the practice of the invention, means are provided to assure the retention of the liner sections in the correct positions with respect to each other and the bearing. To this end the liner sections are provided, in the longitudinally extending edges 13, with registering slots 15, preferably intermediate the ends of the liner sections. On the inner surface of the shims 14 are projections or lugs 16 which extend into the slots 15 to prevent both longitudinal and rotative movement of the liner sections with respect to the bearing.

In practice, the present invention has been found to function in a highly efficient manner. Owing to the interlocking engagement between the liner sections and the shims the liner sections will at all times be retained in the correct position within the bearing irrespective of the effect on the liner of repeated tightening and loosening of the bearing.

I claim:

In a locking device, the combination of a bearing and a cap therefor, semi-cylindrical liner sections in the bearing sections seated in contacting relationship at their longitudinal edges and having registering slots in their adjacent surfaces, shims between the bearing and the cap, and projections on the shims extending into the slots to lock the liner sections against rotary and endwise movement with respect to the bearing.

FRITJOF FRELIN.